United States Patent
Sato et al.

(10) Patent No.: US 7,559,987 B2
(45) Date of Patent: Jul. 14, 2009

(54) GROUTING MATERIAL

(75) Inventors: Takahiro Sato, Muroran (JP); Tomohiro Kanazawa, Muroran (JP); Tadashi Hayasaka, Tokyo (JP); Ken Uoya, Tokyo (JP); Akira Takami, Muroran (JP); Shin-ichiro Tada, Tokyo (JP)

(73) Assignee: Nittetsu Cement Co., Ltd., Hokkaido (JP)

( * ) Notice: Subject to any disclaimer, the term of this patent is extended or adjusted under 35 U.S.C. 154(b) by 0 days.

(21) Appl. No.: 12/278,863

(22) PCT Filed: Feb. 8, 2007

(86) PCT No.: PCT/JP2007/052206

§ 371 (c)(1), (2), (4) Date: Nov. 3, 2008

(87) PCT Pub. No.: WO2007/091629

PCT Pub. Date: Aug. 16, 2007

(65) Prior Publication Data

US 2009/0064902 A1 Mar. 12, 2009

(30) Foreign Application Priority Data

Feb. 9, 2006 (JP) .............................. 2006-031919

(51) Int. Cl.
| | |
|---|---|
| *C04B 18/14* | (2006.01) |
| *C04B 22/08* | (2006.01) |
| *C04B 22/14* | (2006.01) |
| *C09K 17/02* | (2006.01) |
| *C09K 17/06* | (2006.01) |
| *C09K 17/08* | (2006.01) |
| *C09K 17/10* | (2006.01) |
| *C09K 17/14* | (2006.01) |
| *C09K 17/24* | (2006.01) |
| *C09K 17/44* | (2006.01) |

(52) U.S. Cl. ................. 106/790; 106/695; 106/696; 106/778; 106/782; 106/789; 405/264; 405/266

(58) Field of Classification Search ............... 106/695, 106/696, 778, 782, 789, 790; 405/264, 266
See application file for complete search history.

(56) References Cited

U.S. PATENT DOCUMENTS

| 6,923,857 B2 * | 8/2005 | Constantinou et al. ...... 106/695 |
| 2007/0181041 A1 * | 8/2007 | Kanazawa et al. .......... 106/715 |

FOREIGN PATENT DOCUMENTS

| JP | 06-033057 A | 2/1994 |
| JP | 09-255378 A | 9/1997 |
| JP | 11-021160 A | 1/1999 |
| JP | 2002-308660 A | 10/2002 |
| JP | 2003-049164 A | 2/2003 |
| JP | 2004-231884 A | 8/2004 |

* cited by examiner

*Primary Examiner*—Anthony J Green
(74) *Attorney, Agent, or Firm*—Sughrue Mion, PLLC

(57) ABSTRACT

A grouting material which comprises an ultrafine particle material having a maximum particle size of 15 micrometer or less, containing 3 to 40% by mass of cement clinker, 60 to 97% by mass of and blast-furnace slag, 0.5 to 3 parts by mass of gypsum in terms of $SO_3$ based on 100 parts by mass of the total amount of cement clinker and blast-furnace slag, and further comprises (i) 0.7 to 7 parts by mass of calcium-aluminate-based rapid-hardening admixture, (ii) 0.01 to 0.13 parts by mass of setting retarder, and (iii) 0.2 to 1.0 parts by mass of high-performance water-reducing agent, based on 100 parts by mass of the ultrafine particle material can maintain high injectability for long, and rapidly starts to set after injected to thereby exhibit a good short-term strength.

8 Claims, No Drawings

GROUTING MATERIAL

TECHNICAL FIELD

The present invention relates to a composition of a cementitious grouting material used in construction field.

BACKGROUND ART

Construction methods using cementitious grouting materials are being employed not only in foundation of dams, prevention of ground liquefaction, and reinforcement of rock and ground in tunnel excavation, but also in water cut-off treatments in energy-related facilities, industrial waste disposal facilities, and underground structures in urban civil engineering, recently.

As cementitious grouting materials, for grouting into little-permeable ground or for extending the effect of grouting to large area, ultrafine particles grouting materials having a maximum particle size of 10 to 20 μm obtained by pulverizing and classifying a mixture consisting of blast-furnace slag mainly and Portland cement are used, and there are many examples using such materials. (e.g., see Patent Document 1).

Ultrafine particle grouting materials having a fine particle size has strong cohesive property. Due to the apparent particle size, which is coarsened through coagulation, expected grouting effects often fail to be exhibited. For this reason, high-level dispersion of particles is required. As such dispersion, a retardation-type high-performance water-reducing agent is widely used (Patent Document 2).

The amount of a retardation-type high-performance water-reducing agent required for high dispersion of an ultrafine particle grouting material in the grout slurry is relatively much compared with the amount used in concrete or mortar. So hard set and hardening of a high-viscosity dehydrated cake of injected grout are markedly retarded. It takes 10 hours for a dehydrated cake to be hard set even when non-retarding type dispersion agent is used, and 20 to 40 hours when a retarder-type is used, in some cases.

A dehydrated cake of injected grout may fail to obtain sufficient effects of the grouting material in a case either where it receives an external force before setting or hardening or where it contacts with confined water or running water to be removed and washed away from the ground therein. And also if hardening of the dehydrated cake is markedly delayed, the whole construction process including the step next to grouting is disturbed, which may lead to economical disadvantages.

On the other hand, as a grouting for limited area, a grouting material composition using a specific high performance water reducing agent or an inorganic sulfuric acid salt is devised for the purpose of shortening the setting time (Patent Document 3). Such a grouting material has, however, problems that setting and hardening are insufficient and that due to high hydration rate, injectability decreases.

[Patent Document 1] Japanese Patent No. 2894529
[Patent Document 2] Japanese Patent Application Laid-Open No. 2003-49164
[Patent Document 3] Japanese Patent Application Laid-Open No. 2004-231884

DISCLOSURE OF INVENTION

Problems to be Solved by Invention

Under these circumstances, as ultrafine particle grouting material which can satisfy needs of shortening construction work periods with high injectability, there is a demand for properties capable of keeping high injectability for a long time, hard setting rapidly after injection, and having an excellent short-term strength.

Means for Solving Problems

As a result of extensive studies, the present inventors have found out that a grout slurry which has a high injectability, is capable of shortening and controlling setting time and achieves an excellent short-term strength, can be obtained by using a rapid-hardening agent, a setting retarder and a high-performance water-reducing agent in combination with a ultrafine particle grouting material having specific material composition, blending ratio and maximum particle size. Whereby they have completed the present invention.

[1] A grouting material which comprises an ultrafine particle material having a maximum particle size of 15 micrometer or less
  containing
  3 to 40% by mass of cement clinker,
  60 to 97% by mass of and blast-furnace slag
  0.5 to 3 parts by mass of gypsum in terms of $SO_3$ based on 100 parts by mass of the total amount of cement clinker and blast-furnace slag, and further comprises
(i) 0.7 to 7 parts by mass of calcium-aluminate-based rapid-hardening admixture
(ii) 0.01 to 0.13 parts by mass of setting retarder, and
(iii) 0.2 to 1.0 parts by mass of high-performance water-reducing agent, based on 100 parts by mass of the ultrafine particle material.

[2] The grouting material according to 1, wherein the (i) calcium-aluminate-based rapid-hardening admixture contains $12CaO.7Al_2O_3$.

[3] The grouting material according to 2, wherein the (i) calcium-aluminate-based rapid-hardening admixture further contains anhydrite.

[4] The grouting material according to any one of 1 to 3, wherein the (ii) setting retarder is oxycarboxylic acid or a salt thereof.

[5] The grouting material according to any one of 1 to 3, wherein the (iii) high performance water reducing agent is a melamine sulfonic acid-based condensation product.

[6] The grouting material according to 1, wherein the (i) calcium-aluminate-based rapid-hardening admixture contains $12CaO.7Al_2O_3$ and anhydrite, the (ii) setting retarder is sodium gluconate and the (iii) high performance water-reducing agent is a melamine sulfonic acid-based condensation product.

[7] The grouting material according to 1, which in form of a slurry having a water content of 40% by mass starts setting in 2 hours or more and completes setting in 10 hours or less.

[8] The grouting material according to 1, which in form of a slurry having a water content of 40% by mass has a compressive strength of $2N/mm^2$ or more at 1 day age.

Effect of Invention

The ultrafine particle grouting material of the present invention can maintain high injectability for a long period of time and can set and exhibit a short-term strength soon after injected. The grouting material of the present invention can be applied in soil improvement work on little-permeable grounds or on a large area of ground, and then contributes to significant enhancement in injection efficiency and to shortening the work period, as compared with grouting effects obtained by using conventional ultrafine particle grouting material.

Best Mode For Carrying Out Invention

The ultrafine particle material used in the present invention comprises cement clinker, blast-furnace slag and gypsum.

As the cement clinker, a Portland cement clinker according to JIS RS210 may be used. Examples thereof include high-early-strength Portland cement clinker, normal Portland cement clinker, moderate-heat Portland cement clinker, and low-heat Portland cement clinker. Among these, in consideration for injectability and simplicity of controlling setting time, moderate-heat Portland cement clinker is preferred.

As the blast-furnace slag, a rapid-quenched blast-furnace slag according to JIS A6206 may be used. In consideration for strength of the grouting material, blast-furnace slags having a glass content of 90% or more and a basicity of 1.6 or more are preferred.

The blending ratio of the cement clinker and the blast-furnace slag is from 3 to 40% by mass (cement clinker): from 97 to 60% by mass (blast-furnace slag), preferably from 8 to 40% by mass (cement clinker): from 92 to 60% by mass (blast-furnace slag). If the amount of the cement clinker is leas than 3% by mass (i.e., the amount of the blast-furnace slag exceeds 97%), hydration becomes weak, setting does not occur and strength cannot be exhibited as desired. If the amount of the cement clinker exceeds 40% by mass (i.e., the amount of the blast-furnace slag is less than 60% by mass), hydration cannot be controlled and it becomes difficult for the material to maintain injectability.

Gypsum is blended in for the purpose of controlling hydration of the cement clinker and promoting hydration of the blast-furnace slag. As the gypsum, anhydrite or calcium sulfate dihydrate may be used. The blending amount is in a range of 0.5 to 3 parts by mass, preferably 0.6 to 2 parts by mass in terms of $SO_3$, based on the total 100 parts by mass of the cement clinker and the blast-furnace slag. In the amount in terms of $SO_3$ is less than 0.5 parts by mass, hydration control of the cement clinker becomes insufficient and if the amount exceeds 3 parts by mass, hydration of the blast-furnace slag is highly promoted, which leads to a decrease in injectability.

The ultrafine particle material used in the present invention has a maximum particle size of 15 μm or less, preferably, 12 μm or less. By having a maximum particle size of 15 μm or less, injectability can be improved. If the maximum particle size is too small, cohesive force of the material, when prepared into a slurry, becomes too strong, which leads to deterioration in injectability. Therefore, it is preferable that the maximum particle size be 8 μm or more.

Since the ultrafine particle material contains a large amount of fine particle components having a particle size of 2 to 3 μm or smaller, if a slurry is prepared from the material as is, cohesive force becomes markedly high and injectability into ground cannot be maintained. Therefore, when the ultrafine particle material is used as a grouting material, it is essential to blend a water-reducing agent in the material. In the present invention, a high-performance water-reducing agent is blended in.

Examples of the high-performance water-reducing agent used in the present invention include high condensation products of naphthalenesulfonic acids, melamine sulfonic acid condensation products, polycarboxylic acid-based agents and polyether-based agents, which do not contain a composition of setting retardation. Preferred are melamine sulfonic acid condensation products which can especially improve dispersibility in the composition of the present invention. By adding a high-performance water-reducing agent into the material, a grouting material which has high injectability and is able to exhibit a short-term strength can be obtained.

The blending amount of the high-performance water-reducing agent has to be relatively large for the purpose of suppressing significant cohesive force of the ultrafine particle material, as compared with amounts used in conventional concrete or mortar materials. Specifically, the amount is in a range of 0.2 to 1.0 parts by mass, preferably 0.3 to 0.9 parts by mass, based on 100 parts by mass of the ultrafine particle material. If the amount of the high-performance water-reducing agent is less than 0.2 parts by mass, dispersion of the grouting material particles in the slurry becomes insufficient, which leads to failure to obtain injectability as desired. Even if the blending amount exceeds 1.0 part by mass, no significant improvement in injectability can be obtained, setting is delayed and exhibition of the short-term strength is also delayed.

As described above, if the high-performance water-reducing agent is blended in an amount larger than usual, injectability is improved, while setting time is delayed and the short-term strength becomes insufficient, which is detrimental to grouting process. The present invention, by adding a specific amount of a calcium-aluminate-based rapid-hardening admixture and a setting retarder, has succeeded in improving the short- and long-term strength as well as setting time control and injectability.

Examples of the calcium-aluminate-based rapid-hardening admixture used in the present invention include calcium aluminates such as $CaO.Al_2O_3$, $CaO.2Al_2O_3$, $3CaO.Al_2O_3$, and $12CaO.7Al_2O_3$, $11CaO.7Al_2O_3.CaF_2$ in which one CaO of $12CaO.7Al_2O_3$ is substituted by a halide such as $CaF_2$, calcium aluminosilicate in which $SiO_2$ accounts for a large part of the composition, and those containing a $SO_3$ component. These calcium aluminates may be crystalline or amorphous. In consideration for injectability and development of strength, amorphous material is preferred.

Moreover, in consideration for further improvement in short- and long-term strength, a mixture of calcium aluminate and gypsum may be used as the calcium-aluminate-based rapid-hardening admixture. In a case where gypsum is blended into the admixture, the blending amount of gypsum is in a range of 0.5 to 1.5 parts by mass based on 1 part by mass of calcium aluminate, preferably the amount is equivalent to the amount of calcium aluminate. By adding gypsum, development of strength can be excellent.

Preferred examples of the calcium-aluminate-based rapid-hardening admixture used in the present invention include $12CaO.7Al_2O_3$ and a mixture of $12CaO.7Al_2O_3$ and anhydrite.

It is preferable that the calcium-aluminate-based rapid-hardening admixture used in the present invention have a Blaine specific surface area of 5000 $cm^2/g$ or more, more preferably 8000 $cm^2/g$ or more, in terms of fineness. By using such an admixture having a Blaine specific surface area of 5000 $cm^2/g$ or more, a grouting material having excellent injectability, which can shorten setting time and develop a good short-term strength, can be obtained.

The calcium-aluminate-based rapid-hardening admixture may be independently ground to be adjusted to have the above-described fineness. The admixture may be mixed with an ultrafine particle material or other additives and then ground. Also, it may be mixed with a Portland cement clinker or a blast-furnace slag and then be subjected to grinding.

In a case where a slurry is prepared by mixing an ultrafine particle material with a calcium-aluminate-based rapid-hardening admixture, calcium aluminate is rapidly dissolved in the slurry to react with gypsum component to thereby form ettringite and monosulfate and at the same time generate free aluminum hydroxide. Moreover, calcium aluminate promotes hydration of alite which is a mineral of a Portland cement clinker mineral contained in the ultrafine particle grouting material, to thereby serve as a setting accelerator in the synergy with formation of ettringite. On the other hand, aluminum hydroxide is generated on surface of blast-furnace slag particles, and it promotes hydration of blast-furnace slag, and contributes to development of short-term strength.

The blending amount of the rapidly-hardening admixture is in a range of 0.7 to 7 parts by mass, preferably 0.8 to 6.5 parts by mass, based on 100 parts by mass of the ultrafine particle material. Although this addition amount is much smaller than the amount used in concrete or mortar material, the aimed target can be achieved. If the amount is less than 0.7 parts by mass, setting time cannot be shortened and the desired short-term strength can not be developed. If the amount exceeds 7 parts by mass, setting occurs too early and viscosity of the slurry increases, which deteriorates injectability.

The blending amount of the rapidly-hardening admixture depends on uses of grouting and the amount of clinker in the ultrafine particle material. Specifically, if high strength is necessary, a large amount of clinker is blended (for example, from 20 to 40% by mass, preferably from 30 to 40% by mass), and the blending amount of the rapidly-hardening admixture can be small (for example, from 0.7 to 2 parts by mass, preferably from 1.0 to 1.5 parts by mass). On the other hand, if such a high strength is unnecessary, the amount of the clinker can be small (for, example, from 3 to 20% by mass, preferably from 5 to 15% by mass) and the amount of the rapidly-hardening admixture can be large (for example, from 2.5 to 7 parts by mass, preferably from 3 to 6 parts by mass).

Examples of the setting retarder used in the present invention include oxycarboxylic acids such as gluconic acid, citric acid, tartaric acid and malic acid, and salts thereof. Preferred salts are alkali metal salts such as sodium salt and potassium salt. A preferred setting retarder is an alkali metal salt of gluconic acid, more preferred is sodium gluconate. Sodium gluconate can efficiently retard hydration of calcium aluminate and control formation time of ettringite which causes deterioration in injectability so that high injectability can be maintained. Also, in the synergetic effect with high-performance water-reducing agent, high dispersion of the slurry can be maintained.

The blending amount of the setting retarder is in a range of 0.01 to 0.13 parts by mass, preferably 0.02 to 0.12 parts by mass, based on 100 parts by mass of the ultrafine particle material. If the amount is less than 0.01 parts by mass, the effect of retarding hydration of the rapid-hardening admixture cannot be expected and injectability decreases at an early stage. If the amount exceeds 0.13 parts by mass, high injectability can be maintained but setting time is prolonged, which results in difficulty in development of a short-term strength.

The grouting material of the present invention can be produced by conventional methods. For example, a method in which components having a fineness adjusted by grinding treatment when necessary are mixed with each other, a method in which one or more components are mixed together and then subjected to grinding treatment when necessary, and subsequently other components are added thereto and a method in which all components are mixed together and then the mixture is subjected to grinding treatment to adjust the fineness or the like may be employed.

The grouting material of the present invention is used in form of aqueous slurry. A preferred amount of water to be added is in a range of 70 to 1000 parts by mass, based on 100 parts by mass as the total amount of the ultrafine particle material and the calcium-aluminate-based rapid-hardening admixture. There is no particular limitation on the method for preparing the slurry. For example, the slurry is prepared by placing the grouting material of the present invention and water into a grout mixer or the like and mixing them together while stirring.

When an aqueous slurry containing the grouting material of the present invention is injected into ground or the like, water content escapes by the injection pressure and the water content in the slurry is reduced. Then, the slurry reaches a state of a dehydrated cake having water content less than 60% by mass, and then hardening reaction of it becomes fully in progress.

In the grouting material of the present invention, it is preferable that setting start time of a slurry having water content of 40% by mass be 2 hours or more and that setting-end time be 10 hours or less.

If the setting start time is less than 2 hours, since the injected slurry begins to set before it reaches the target range, injection cannot cover a desired area. If the setting-end time exceeds 10 hours, the grouting material after injected may go beyond the target ground area or flow out of the area. A preferred range of setting start time is from 2 to 6 hours and a preferred range of setting-end time is from 3 to 9 hours. The setting start time and setting-end time are measured according to the method described in Examples below.

Further, in the grouting material of the present invention, it is preferable that slurry having water content of 40% by mass be adjusted such that the compressive strength at 1 day age can be $2N/mm^2$ or more.

Controlling of setting time and compressive strength at 1 day age can be conducted by mainly selecting the blending amount of the calcium-aluminate-based rapid-hardening admixture. The compressive strength is measured according to the method described in Examples.

Further, improvement in injectability with the setting time and the compressive strength at 1 day age being maintained can be made mainly by selecting the blending amount of the high-performance water-reducing agent and setting retardant.

EXAMPLES

Hereinafter, the invention is described in greater detail by referring to Examples and Comparative Examples. The scope of the invention is not limited to these Examples.

The composition and fineness of the ultrafine particle materials used in Examples and Comparative Examples (D and E; manufactured by NITTETSU CEMENT CO., LTD.) are shown in Table 1. The fineness was measured by using PRO7000S (manufactured by SEISHIN ENTERPRISE CO., LTD.).

[Table 1]

TABLE 1

| | Moderate-heat Portland cement clinker (Parts by mass) | Blast-furnace slag (Parts by mass) | gypsum (Parts by mass in terms of $SO_3$) | Maximum particle size (μm) |
|---|---|---|---|---|
| D | 35 | 65 | 1.0 | 12 |
| E | 10 | 90 | 1.5 | 12 |

The moderate-heat Portland cement clinker used here was manufactured by NITTETSU CEMENT CO., LTD., with mineral contents of $C_3S$ 40% and $C_3A$ 1.4%. The blast-furnace slag was manufactured by NIPPON STEEL CORPORATION, with a glass content of 99%, and as the gypsum, natural anhydrite was used.

As for each of the additives, the following materials were used.

(A) Calcium-Aluminate-Based Rapid-Hardening Admixture

Biform (product name); manufactured by DENKI KAGAKU KOGYO KABUSHIKI KAISHA, Blaine specific surface area: 5600 $cm^2/g$, a mixture of equal parts of calcium aluminate and gypsum)

(B) Setting Retarder

Sodium gluconate (manufactured by Astellas Pharma Inc.)

(C) High-Performance Water-Reducing Agent

Sikament FF86 (product name); manufactured by Sika Ltd. Japan

Comparative Materials

High-performance water-reducing agent: Mighty 150R (product name); manufactured by Kao Corporation Setting retarder: Sodium carbonate (Soda Ash (product name); manufactured by Central Glass Co., Ltd.)

Examples 1~8

Comparative Examples 1~14

By using the above materials, slurries and pastes were prepared according to the blending conditions and water contents (water/ultrafine particle material+rapid-hardening admixture) shown in Table 2. The injectability, setting time and short-term strength were measured and comprehensive evaluation of each grouting material was made. The results are shown in Table 3.

The method for each evaluation is described below.

(1) Injectability

After stirring 500 ml of slurry having a water content of 100% by mass with an electric mixer for 3 minutes, the slurry was injected in to a stainless-steel slit (coefficient of permeability: $7.6 \times 10^{-2}$ cm/s) of 0.1 mm×38 mm×50 mm under pressure condition of about 100 kpa (1 $kgf/cm^2$). The passage amount of the slurry was measured to determine injectability. This evaluation was made at the immediate state and the later state of slurry. As for the measurement of the later state, injection was conducted 60 minutes after preparation of the slurry and the passage amount was measured under the same condition. As the end of this measurement, the time when passing rate of slurry through the slit is 0.5 ml/10 sec was decided.

(2) Setting Time

After kneading paste having a water content of 40% by mass with a mortar mixer for 2 minutes, the paste was evaluated on the start and end of setting according to JIS R5201. The water content was set to 40% according to a water content of dehydrated cake by the filtration test, assumed injected slurry was under pressure. The filtration test was that a slurry having a water content of 100% was filtrated with a paper filter under about 300 kPa (3 $kgf/cm^2$), and the dehydration amount of it was determined.

(3) Short-Term Strength

In the similar manner with the evaluation on setting time, after kneading paste having a water content of 40% by mass with a mortar mixer for 4 minutes, the paste was put into a mold of φ5×10 cm and formed, and the short-term strength was evaluated at each material age of 1 day and 7 days according to compressive strength test described in JIS A1108. The material was cured at a temperature of 20±1° C. until each of the material ages.

(4) Properties of Grouting Material (Comprehensive Evaluation)

Comprehensive evaluation was made on the three properties of injectability, setting time and short-term strength.

[Table 2]

TABLE 2

| | Ultrafine particle material | Rapid-hardening admixture (A) | Setting retarder (B) | High-Performance water-reducing agent(C) | Mighty 150R | Sodium carbonate |
|---|---|---|---|---|---|---|
| Example 1 | D | 1.0 | 0.05 | 0.6 | | |
| Example 2 | D | 1.0 | 0.05 | 0.7 | | |
| Example 3 | D | 1.0 | 0.05 | 0.8 | | |
| Example 4 | D | 1.5 | 0.10 | 0.6 | | |
| Example 5 | E | 3.0 | 0.03 | 0.4 | | |
| Example 6 | E | 4.0 | 0.03 | 0.4 | | |
| Example 7 | E | 5.0 | 0.05 | 0.4 | | |
| Example 8 | E | 6.0 | 0.05 | 0.4 | | |
| Comparative Example 1 | D | 0.5 | 0.05 | 0.6 | | |
| Comparative Example 2 | D | 8.0 | 0.10 | 0.6 | | |
| Comparative Example 3 | D | 1.0 | | 0.6 | | |
| Comparative Example 4 | D | 1.0 | 0.15 | 0.6 | | |
| Comparative Example 5 | D | 1.0 | 0.05 | 0.1 | | |

TABLE 2-continued

|  | Ultrafine particle material | Rapid-hardening admixture (A) | Setting retarder (B) | High-Performance water-reducing agent(C) | Mighty 150R | Sodium carbonate |
|---|---|---|---|---|---|---|
| Comparative Example 6 | D | 1.0 | 0.05 | 1.5 | | |
| Comparative Example 7 | D | | | | 1.0 | |
| Comparative Example 8 | E | | | | 0.75 | |
| Comparative Example 9 | D | | | 0.6 | | |
| Comparative Example 10 | E | | | 0.4 | | |
| Comparative Example 11 | D | | | 0.6 | | 2.0 |
| Comparative Example 12 | E | | | 0.4 | | 2.0 |
| Comparative Example 13 | D | | | | | |
| Comparative Example 14 | E | | | | | |

(Each of the values shows parts by mass based on 100 parts by mass of ultrafine particle material.)

[Table 3]

TABLE 3

| Example No. | Injected amount (ml) | | Setting time (hours) | | Compressive strength (N/mm$^2$) | | Comprehensive Evaluation | | | |
|---|---|---|---|---|---|---|---|---|---|---|
| | Immediate after stirring | 60 Minutes later | start | end | Day 1 | Day 7 | Inject-ability | Setting time | Develop-ment of strength | Overall rating |
| 1 | 500 | 224 | 4.1 | 5.2 | 7.8 | 51.0 | Δ | ○ | ○ | ○ |
| 2 | 500 | 424 | 4.7 | 5.6 | 6.9 | 50.0 | Δ | ○ | ○ | ○ |
| 3 | 500 | 500 | 5.3 | 7.5 | 6.0 | 50.6 | ○ | ○ | ○ | ◎ |
| 4 | 500 | 328 | 3.1 | 4.8 | 9.2 | 50.1 | Δ | ○ | ○ | ○ |
| 5 | 500 | 500 | 3.3 | 7.1 | 2.0 | 33.1 | ○ | ○ | ○ | ◎ |
| 6 | 500 | 500 | 3.3 | 6.8 | 4.1 | 32.6 | ○ | ○ | ○ | ◎ |
| 7 | 500 | 354 | 2.1 | 4.7 | 7.6 | 30.8 | Δ | ○ | ○ | ○ |
| 8 | 500 | 250 | 2.1 | 4.6 | 8.4 | 31.5 | Δ | ○ | ○ | ○ |
| Comp. Ex. 1 | 500 | 380 | 8.5 | 12 | 6.2 | 50.5 | Δ | X | ○ | X |
| Comp. Ex. 2 | 388 | 55 | 1.1 | 1.3 | 12.2 | 48.3 | X | X | ○ | X |
| Comp. Ex. 3 | 500 | 86 | 3.1 | 4.0 | 5.8 | 51.1 | X | ○ | ○ | X |
| Comp. Ex. 4 | 500 | 500 | 18 | 25 | —*³ | 42.7 | ○ | X | X | X |
| Comp. Ex. 5 | 403 | 82 | 4.0 | 6.2 | 6.6 | 51.5 | X | ○ | ○ | X |
| Comp. Ex. 6 | 500 | 500 | 7.8 | 10.3 | 0.7 | 49.5 | ○ | X | X | X |
| Comp. Ex. 7 | 500 | 500 | 26 | 32 | —*³ | 39.6 | ○ | X | X | X |
| Comp. Ex. 8 | 500 | 500 | 40 | 50 | —*³ | 29.0 | ○ | X | X | X |
| Comp. Ex. 9 | 500 | 280 | 7.2 | 9.0 | 1.2 | 47.3 | Δ | X | X | X |
| Comp. Ex. 10 | 500 | 500 | 8.5 | 11.0 | —*³ | 28.5 | ○ | X | X | X |
| Comp. Ex. 11 | 500 | 82 | 4.0 | 6.2 | 3.2 | 51.5 | X | ○ | ○ | X |
| Comp. Ex. 12 | 500 | 103 | 3.5 | 5.5 | 1.4 | 30.3 | X | ○ | X | X |

TABLE 3-continued

| Example No. | Injected amount (ml) | | Setting time (hours) | | Compressive strength (N/mm$^2$) | | Comprehensive Evaluation | | | |
|---|---|---|---|---|---|---|---|---|---|---|
| | Immediate after stirring | 60 Minutes later | start | end | Day 1 | Day 7 | Inject-ability | Setting time | Develop-ment of strength | Overall rating |
| Comp. Ex. 13 | 152 | 53 | 4.8 | 6.0 | 6.2 | 43.5 | X | ○ | ○ | X |
| Comp. Ex. 14 | 350 | 120 | 5.5 | 6.7 | 1.4 | 28.2 | X | ○ | X | X |

*$^3$not removable from the mold (1 day)

Evaluation
Injectability:
○ 500 ml passed at immediate after stirring and 500 ml passed at 60 minutes after stirring
Δ 500 ml passed at immediate after stirring and 200 ml or more passed at 60 minutes after stirring
X Less than 500 ml passed at immediate after stirring and less than 200 ml passed at 60 minutes after stirring
Setting time:
○ Setting started in 2 hours or more and ended less than 10 hours
X Setting started in 2 hours or more and ended in less than 10 hours
Development of Strength:
○ strength of 1 day was 2N/mm2 or more
X strength of 1 day was less than 2N/mm2
Overall rating:

⊚=○+○+○

○=○+○+Δ

X=one or more of injectability, setting time and strength was x

In Comparative Example 1 where only 0.5 parts by mass of the rapid-hardening admixture was blended, although the injectability was satisfactory, the setting time exceeded 10 hours. On the other hand, in Comparative Example 2 where 8 parts by mass of the rapid-hardening admixture was blended, although the setting time was good, the injectability began to deteriorate immediately after injection and the passage amount was less than 500 ml.

In Comparative Example 3 where no setting retarder was used, injectability decreased later state, and in Comparative Example 4 where 0.15 parts by mass of setting retardant was blended, the setting time was 25 hours, which was a marked delay, development of the short-term strength was so unsatisfactory that the material could not removed from the mold at material age of 1 day.

In comparative Example 5 where only 0.1 parts by mass of high-performance water-reducing agent was blended, viscosity of the slurry was so high that the injectability was less than 500 ml. In comparative Example 6 where 1.5 parts by mass of high-performance water-reducing agent was blended, the setting time exceeded 10 hours.

In comparative Examples 7 and 8 where high-performance water-reducing agent having setting retarder blended therein (mighty 150R) was used, the setting time was prolonged to a range of 26 to 50 hours, and adsorption of the high-performance water-reducing agent and influence of the setting retarder contained in the high-performance water-reducing agent were markedly observed.

In Comparative Example 9 where only high-performance water-reducing agent was blended into the ultrafine particles grouting material (D), although the injectability and setting time were satisfactory, development of the short-term strength was unsatisfactory. In Comparative Example 10 where only high-performance water-reducing agent was blended into the ultrafine particles grouting material (E), although the injectability was satisfactory, the setting time and development of the short-term strength were so unsatisfactory that the material could not be removed from the mold at material age of 1 day.

In Comparative Examples 11 and 12 where sodium carbonate was blended, although the setting time and the injectability immediately after stirring were good, the injectability at 60 minutes after stirring decreased. This is due to acceleration of hydration proceeding for a relatively short time of the 60 minutes.

In Comparative Examples 13 and 14 where no admixture or agents were added, viscosity of the slurry was higher than that of Comparative Example 5, and the injectability was less than 500 ml even immediately after kneading.

Based on the comprehensive evaluation, the grouting materials of Comparative Examples 1 to 14 failed to achieve one or more of desired injectability, setting time and development of short-term strength.

On the other hand, the grouting materials of Examples 1 to 8 were excellent in injectability immediately after stirring and setting time. Also, these materials showed injectability of 200 ml or more even at 60 minutes after stirring. Especially, the grouting materials of Examples 3, 5 and 6 were good in that the slurry could pass through the slit in an amount of 500 ml after 60 minutes, and the injectability was as high as that of Comparative Example 7. In addition, the setting time was much shorter and in terms of the short-term strength, the compressive strength of 1 day was 2 N/mm$^2$ or more.

Based on the comprehensive evaluation, the grouting materials of Examples 1 to 8 succeeded in achieving all of desired injectability, setting time and development of short-term strength. Especially, it is understood that the grouting materials of Examples 3, 5 and 6 were good in that they could maintain high injectability.

Injection Test Example

A slurry was prepared by adding 600 parts by mass of water to a grouting material of the present invention comprising 1 part by mass of rapid-hardening admixture (A), 0.05 parts by mass of setting retarder (B) and 0.7 parts by mass of high-performance water-reducing agent (C) blended in 100 parts by mass of ultrafine particle material (D). Then, 600 l of the slurry was injected into a cutting face of a tunnel under a pressure of 4 MPa over 50 minutes. Next, 600 l of a slurry prepared by adding 400 parts by mass of water to a grouting material having the same composition as above was injected under a pressure of 4 MPa over 45 minutes. Subsequently, a slurry prepared by adding 200 parts by mass of water to a grouting material having the same composition as above was injected under a pressure of 4 MPa.

For comparative test, a slurry was prepared by adding 600 parts by mass of water to a grouting material comprising 1 part by mass of Mighty 150 R blended in 100 parts by mass of ultrafine particle material (D). Then 600 l of the slurry was injected into a cutting face of a tunnel under a pressure of 4 MPa over 60 minutes. Next, 600 l of a slurry prepared by adding 400 parts by mass of water to a grouting material having the same composition as above was injected under a pressure of 4 MPa.

In the case where the grouting material of the present invention was used for injection, the injection amount drastically decreased to zero in about 190 minutes, and it was observed at that time point that the material had been hardened. On the other hand, in the other case where Mighty 150R was used, although the injection amount was almost the same with the amount of the grouting material of the present invention, injection continued at a rate of several liters per minute even after 190 minutes.

Thus, since the grouting material of the present invention was hardened in a short time, and as compared with the case using Mighty 150R, the injection packer could be removed much earlier. This enables the construction work period to be shortened. In this way, in practical construction, the effect of the grouting material of the present invention can be secured.

The invention claimed is:

1. A grouting material which comprises an ultrafine particle material having a maximum particle size of 15 micrometer or less
    containing
        3 to 40% by mass of cement clinker,
        60 to 97% by mass of blast-furnace slag
        0.5 to 3 parts by mass of gypsum in terms of $SO_3$ based on 100 parts by mass of the total amount of cement clinker and blast-furnace slag,
    and further comprises
        (i) 0.7 to 7 parts by mass of calcium-aluminate-based rapid-hardening admixture
        (ii) 0.01 to 0.13 parts by mass of setting retarder, and
        (iii) 0.2 to 1.0 parts by mass of high-performance water-reducing agent, based on 100 parts by mass of the ultrafine particle material.

2. The grouting material according to claim 1, wherein the (i) calcium-aluminate-based rapid-hardening admixture contains $12CaO \cdot 7Al_2O_3$.

3. The grouting material according to claim 2, wherein the (i) calcium-aluminate-based rapid-hardening admixture further contains anhydrite.

4. The grouting material according to claim 1, wherein the (ii) setting retarder is oxycarboxylic acid or a salt thereof.

5. The grouting material according to claim 1, wherein the (iii) high performance water reducing agent is a melamine sulfonic acid-based condensation product.

6. The grouting material according to claim 1, wherein the (i) calcium-aluminate-based rapid-hardening admixture contains $12CaO \cdot 7Al_2O_3$ and anhydrite, the (ii) setting retarder is sodium gluconate and the (iii) high performance water-reducing agent is a melamine sulfonic acid-based condensation product.

7. The grouting material according to claim 1, which in form of a slurry having a water content of 40% by mass starts setting in 2 hours or more and completes setting in 10 hours or less.

8. The grouting material according to claim 1, which in form of a slurry having a water content of 40% by mass has a compressive strength of $2N/mm^2$ or more at 1 day age.

* * * * *